(12) United States Patent
Tripathy

(10) Patent No.: US 11,675,368 B2
(45) Date of Patent: Jun. 13, 2023

(54) SYSTEMS AND METHODS FOR PRESERVING ROUTE INSTRUCTION INFORMATION

(71) Applicant: Westinghouse Air Brake Technologies Corporation, Wilmerding, PA (US)

(72) Inventor: Janmejay Tripathy, Cedar Rapids, IA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 226 days.

(21) Appl. No.: 16/741,334

(22) Filed: Jan. 13, 2020

(65) Prior Publication Data

US 2021/0216081 A1 Jul. 15, 2021

(51) Int. Cl.
G05D 1/02 (2020.01)
G05D 1/00 (2006.01)

(52) U.S. Cl.
CPC ......... *G05D 1/0282* (2013.01); *G05D 1/0061* (2013.01)

(58) Field of Classification Search
CPC .. G05D 1/0061; G05D 1/0282; G05D 1/0011; G05D 1/0022; G05D 1/021; G05D 1/022; G05D 1/0223; G05D 1/0276; G05D 1/028; B60K 3/0058; B61L 23/00; B61L 27/00; B61L 27/0038; B61L 27/0044; B61L 27/005; B61L 27/04
See application file for complete search history.

(56) References Cited

U.S. PATENT DOCUMENTS

| 2013/0197719 A1* | 8/2013 | Nagasawa | G05D 1/0297 701/2 |
| 2018/0196426 A1* | 7/2018 | Kim | B61L 15/0027 |
| 2020/0257559 A1* | 8/2020 | Suvitie | G06F 9/3887 |

\* cited by examiner

*Primary Examiner* — Aaron L Troost
(74) *Attorney, Agent, or Firm* — William Breeze; The Small Patent Law Group LLC

(57) ABSTRACT

A system includes one or more processors configured to be disposed onboard a vehicle. When in an active state of the vehicle in which the system receives instructions from an off-board system, the one or more processors receive enforcement targets from an off-board source. The enforcement targets are associated with corresponding portions of a route, and have corresponding associated enforcement activities to be performed based on location of the vehicle relative to the corresponding portions of the route. The one or more processors are also configured to store at least some of the received enforcement targets onboard the vehicle as preserved targets having corresponding preserved enforcement activities, responsive to a transition from the active state to a degraded state of the vehicle in which the enforcement targets are no longer received. Also, the one or more processors are configured to perform the preserved enforcement activities associated with the preserved targets.

21 Claims, 3 Drawing Sheets

SYSTEMS AND METHODS FOR PRESERVING ROUTE INSTRUCTION INFORMATION

BACKGROUND

Technical Field

The subject matter described relates to systems and methods that control movements of vehicles.

Discussion of Art

Certain vehicles travel along routes and receive control messages or commands from off-board sources. However, during operation, a vehicle may lose contact with a source of control messages or commands or may enter a degraded state where the control messages or commands are no longer received. Accordingly, the vehicle may lose the benefit of the information from the off-board source.

BRIEF DESCRIPTION

In one embodiment, a system includes one or more processors configured to be disposed onboard a vehicle. The one or more processors are configured to receive, when in an active state of the vehicle in which the system receives instructions from an off-board system, enforcement targets from an off-board source. The enforcement targets are associated with corresponding portions of a route to be traversed by the vehicle, and have corresponding associated enforcement activities to be performed based on location of the vehicle relative to the corresponding portions of the route. The one or more processors are also configured to store at least some of the received enforcement targets onboard the vehicle as preserved targets having corresponding preserved enforcement activities, responsive to a transition from the active state to a degraded state of the vehicle in which the enforcement targets are no longer received. Also, the one or more processors are configured to perform the preserved enforcement activities associated with the preserved targets.

In one embodiment, a system includes one or more processors configured to be disposed onboard a vehicle. The one or more processors are configured to receive, when in an active state of the vehicle in which the system receives instructions from an off-board system, enforcement targets from an off-board source. The enforcement targets are associated with corresponding portions of a route to be traversed by the vehicle, and have corresponding associated enforcement activities to be performed based on location of the vehicle relative to the corresponding portions of the route. The one or more processors are also configured to store at least some of the received enforcement targets onboard the vehicle as preserved targets having corresponding preserved enforcement activities, responsive to a transition from the active state to a degraded state of the vehicle in which the enforcement targets are not received. Further, the one or more processors are configured to provide a prompt to the off-board source responsive to the transition from the active state to the degraded state.

In one embodiment, a method includes receiving, when in an active state of a vehicle in which the vehicle receives instructions from an off-board system, enforcement targets from an off-board source. The enforcement targets are associated with corresponding portions of a route to be traversed by the vehicle, and have corresponding associated enforcement activities to be performed based on location of the vehicle relative to the corresponding portions of the route. The method also includes storing at least some of the received enforcement targets onboard the vehicle as preserved targets having corresponding preserved enforcement activities, responsive to a transition from the active state to a degraded state of the vehicle in which the enforcement targets are not received. Further, the method includes performing the preserved enforcement activities associated with the preserved targets.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to systems and methods for vehicles that receive targets or other instructions from an off-board system, with the targets corresponding to limits or requirements on vehicle control through a portion of a route. In some circumstances, vehicles may transition to a degraded state in which they stop receiving the targets. Various embodiments disclosed herein notify a dispatcher and/or an operator of a vehicle about an active targets list from an off-board source that were present when the vehicle transitions from an active state to a degraded state in which targets are no longer received from the off-board source. Further, embodiments preserve the received targets list and provide an interface with the crew to account for the actions and/or implement actions autonomously.

In some embodiments, a system provides guidance to a vehicle crew by displaying a degraded system warning prompt along with target details (of targets that had been received before the transition to the degraded state) for the crew to review. Additionally or alternatively, a list of active targets received may be sent to a dispatcher and/or other off-board system to inform the recipient of which targets have been received and which have not.

It may be noted that while example embodiments may be discussed in connection with rail vehicle systems, that not all embodiments described herein are limited to rail vehicle systems and/or positive train control systems. For example, one or more embodiments of the systems and methods described herein can be used in connection with other types of vehicles receiving power as they travel along a route, such as automobiles, trucks, buses, mining vehicles, marine vessels, agricultural vehicles, other off-highway vehicles, or the like. Further, while various examples may be utilized in connection with a positive control system (e.g., a system in which a vehicle is not allowed to enter a route segment unless a signal is received that gives permission), it may be noted that other embodiments may be utilized in connection with negative control systems (e.g., a system in which a vehicle is allowed to enter any route segment unless a signal is received denying permission) and/or other types of control systems.

Figure 1:
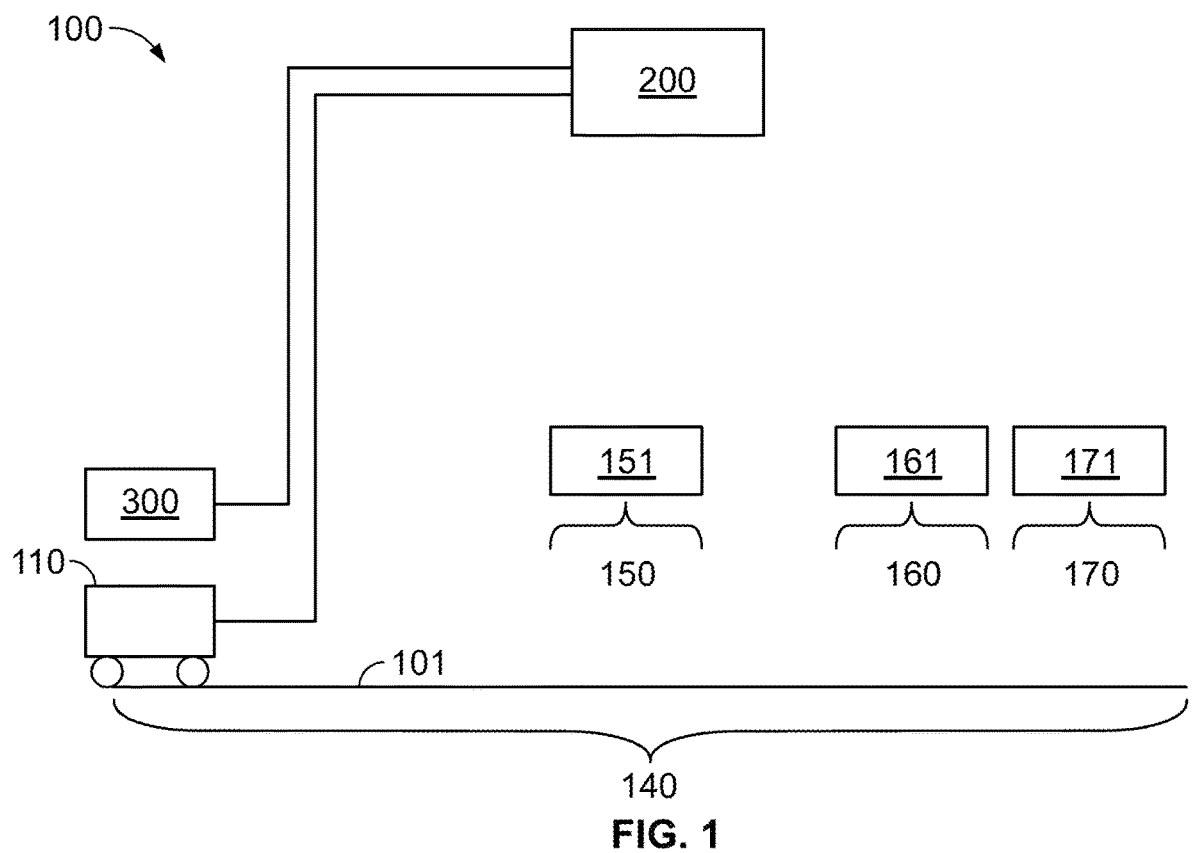
FIG. 1 illustrates one example of a network including a vehicle that receives instructions from an off-board system.

FIG. 1 illustrates an example network 100 that includes a vehicle 110, an off-board control system 200, and a target preservation system 300. The vehicle 110 traverses routes 101 of the network 100, with the route 101 (or a portion thereof) associated with or administered by the off-board control system 200. The off-board control system 200 provides instructions to the target preservation system 300, and the target preservation system 300 controls the vehicle 110 pursuant to the instructions. The off-board control system 200 is an example of an off-board system from which the target preservation system 300 receives instructions (e.g., instructions for controlling the vehicle 110). The instructions from the off-board control system include enforcement targets. The enforcement targets are associated with corresponding portions of the route 101 traversed by the vehicle 110, and have corresponding associated enforcement activities to be performed based on the location of the vehicle relative to the corresponding portions of the route (e.g., how close the vehicle is relative to a corresponding route portion, whether the vehicle is inside the corresponding route portion, whether the vehicle is outside the corresponding route portion). For example, in the illustrated embodiment, the route 101 includes a first portion 150, a second portion 160, and a third portion 170. The various portions 150, 160, 170 may be part of a territory 140 administered by the off-board control system 200. A first target 151 is associated with the first portion 150, a second target 161 is associated with the second portion 160, and a third target 171 is associated with the third portion 170. The targets and instructions may be provided to the target preservation system 300 and/or vehicle 110 on an ongoing, periodic, or repeated basis, and/or may be based on vehicle position (e.g., targets provided responsive to the vehicle 110 entering a territory governed by the off-board control system 200). A single vehicle 110 is shown traversing a single route 101 of the network 100 in FIG. 1 for ease and clarity of illustration, however multiple vehicles may traverse multiple routes of the network 100.

The off-board control system 200 is located off-board the vehicle 110 and is configured to provide information and/or commands to the vehicle 110 (e.g., to target preservation system 300 disposed on board the vehicle 110 in the illustrated example). The off-board control system 200 may also provide information and/or commands to other vehicles traversing various routes of the network. The target preservation system 300 is configured to help control the vehicle 110 based on the instructions or commands received from the off-board control system 200. It may be noted that the target preservation system 300 is disposed on-board the vehicle 110 in an illustrated example (see FIG. 3 and related discussion), but all or a portion of the target preservation system 300 may be disposed off-board of the vehicle 110 and communicate (e.g., via wireless communication) with the vehicle.

Generally, as used herein, an enforcement target may be understood as an instruction or limitation regarding operation of the vehicle in a corresponding portion of the route. The enforcement target may include a direction to an operator and/or an interventional activity autonomously performed. For example, if an enforcement target is critical enough or relates to a sufficient risk where there may not be sufficient time for operator recognition or implementation, an enforcement target may include a control or command that is autonomously performed. Further, an enforcement target may over-ride an attempted action by an operator. As another example, an enforcement target may include both instruction and intervention. For instance, an enforcement target may include a speed limit for which an operator is notified. However, if the operator fails to follow the instruction (e.g., exceeds the speed limit by a predetermined amount and/or exceeds the speed limit for a predetermined amount of time), the enforcement target may be autonomously implemented to control the vehicle to slow to the speed limit. In various embodiments, examples of enforcement targets may include one or more of a speed limit for a particular portion of a route, a direction to follow a signal (e.g., electronic or visual signal) located or received at an upcoming portion of a route, an instruction related to a movement authority (e.g., position of a switch), an instruction to stop and wait for another vehicle to vacate an upcoming portion of route, a crossing obstruction or other obstruction in an upcoming portion of a route, an instruction regarding a work zone (e.g., stop or slow down in portions of a work zone), or instructions regarding a grade crossing (e.g. stop or slow down before approaching a grade crossing).

When the vehicle 110 is functioning properly and in an active state, the vehicle 110 is capable of receiving instructions, and/or receives instructions from the off-board system 200. Accordingly, in the active state, the vehicle 110 (e.g., target preservation system 300 disposed on-board the vehicle 110 and/or one or more other systems disposed on the vehicle 110) receives enforcement targets from the off-board control system 200. However, it may be noted that the vehicle 110 during operation may transition from the active state to a degraded state. In the degraded state, the vehicle 110 does not receive the enforcement targets.

In various examples, degraded states include a disengaged state (e.g., a degraded state entered due to a non-synchronized subdivision, unknown or invalid location signal, or invalid speed), and a cutout or failed state (e.g., a degraded state entered due to a fault detection or a system cutout). Examples of causes of degradation or transition to the degraded state include detection of a fault, crew action, office cutout, loading of a new configuration, a non-synchronized subdivision, and unknown or improper global positioning system (GPS) signals. For example, the vehicle 110 may transition to the degraded state due to a failure of one or more communication components that communicably couple the vehicle 110 to the off-board control system 200. As another example, a GPS receiver disposed on-board the vehicle 110 may fail, causing the off-board control system 200 to not have information on the location of the vehicle 110.

When the vehicle 110 is in the degraded state, instructions or messages including enforcement targets are no longer received by the vehicle 110. Conventionally, transition to the degraded state caused loss of enforcement targets, as they are no longer received or processed by the vehicle 110. However, in the illustrated embodiment, as discussed herein, the target preservation system 300 is configured to preserve and implement enforcement targets that were previously received before a transition from the active state to the degraded state. Accordingly, various embodiments improve the safety, reliability, and efficiency of the operation of the vehicle 110 by implementing enforcement targets that otherwise would have been lost.

Figure 2:
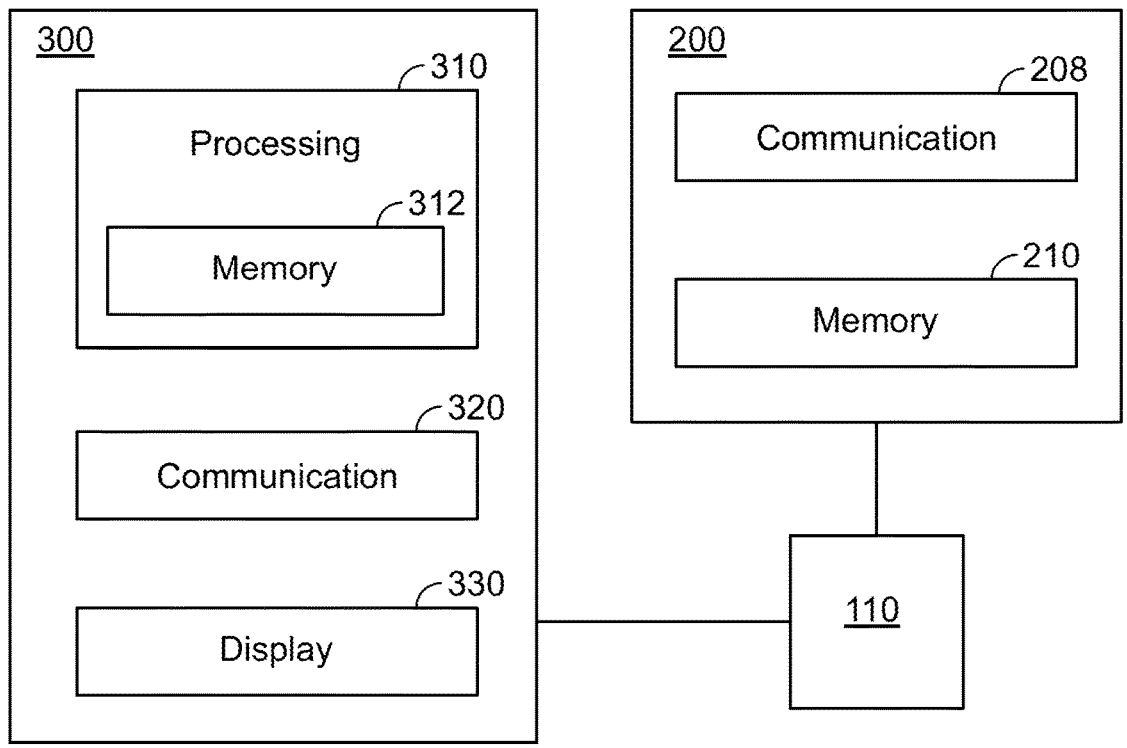
FIG. 2 provides a schematic block diagram of example aspects of the network of FIG. 1.

FIG. 2 provides a schematic block diagram of aspects of the network 100 according to various embodiments. As seen in FIG. 2, the depicted target preservation system 300 includes a processing unit 310, a communication unit 320, and a display 330. It may be noted that in various examples the target preservation system 300 (or a portion thereof) may be disposed on the vehicle 100, and one or more aspects of the target preservation system 300 (e.g., communication unit 320, display 330) may be shared with one or more other systems of the vehicle 110. Generally, the target preservation system 300 determines when the vehicle 110 transitions from the active state to the degraded state, and preserves received enforcement targets responsive to the transition from the active state to the degraded state. For example, the target preservation system 300 may receive one or more signals indicating a transition from the active state to the degraded state. For example, a signal may be received from a sensor detecting a fault that causes a transition to the degraded state. As another example, a signal may be received responsive to a crew or office input corresponding to a transition to the degraded state.

In the example embodiment, the target preservation system 300 is configured to communicate with the off-board control system 200. The off-board control system 200 in various embodiments may be referred to as a vehicle management control system or an off-board control system. The off-board control system 200 can represent hardware circuitry that includes and/or is connected with one or more processors that perform the operations of the off-board control system. The off-board control system 200 can include or be connected with a communication device 208 that is configured to communicate with the target preservation system 300 and/or the vehicle 110.

The off-board control system 200 in various embodiments can be, include, or be a part of a back-office server of a positive control system. Alternatively, the off-board control system 200 can be another system that monitors movements of the vehicles to ensure safe travel of the vehicles. For example, the off-board control system 200 can be configured as, form a part of, or be associated with a dispatch facility, a scheduling facility, or the like. The off-board control system 200 can include a tangible and non-transitory computer-readable storage medium (e.g., a memory 210) that stores, for example, enforcement targets located within a territory associated with or administered by the off-board control system 200.

Figure 3:
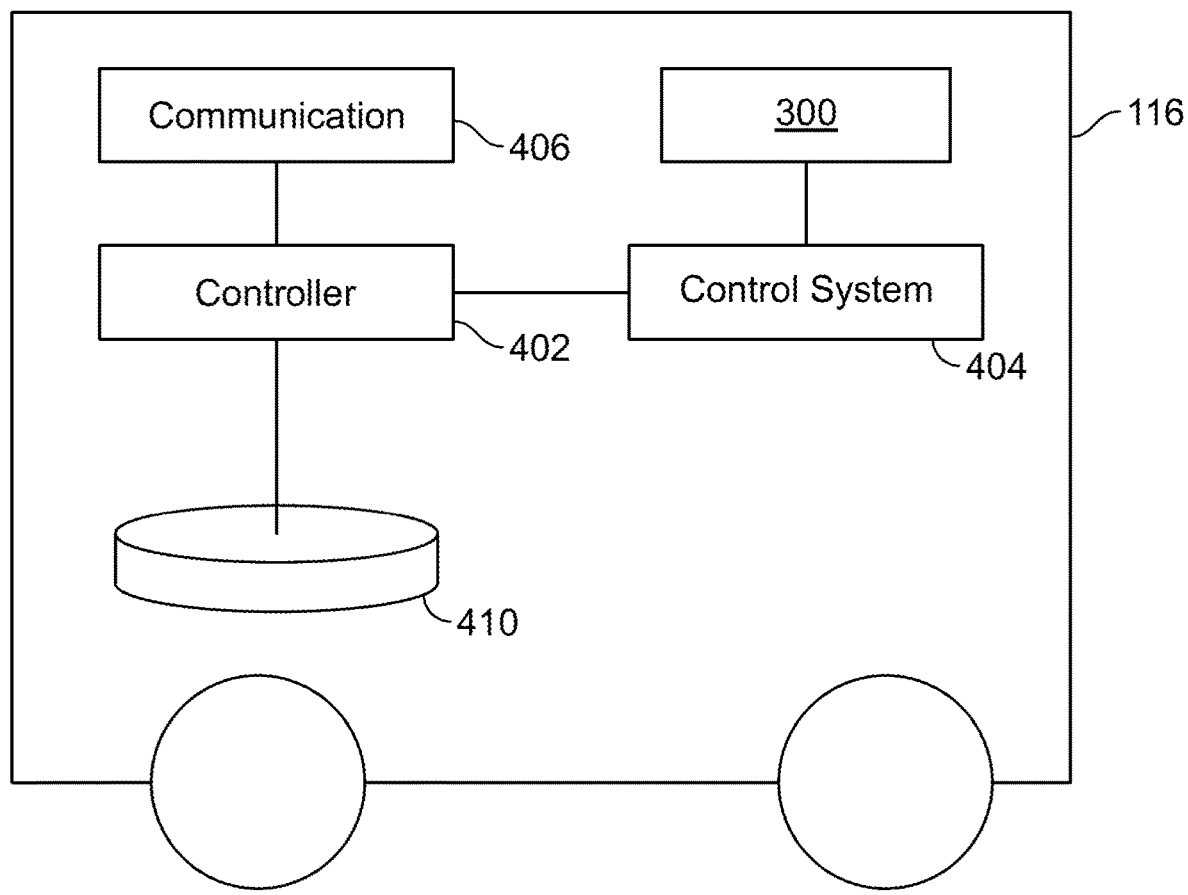
FIG. 3 provides a schematic block diagram of aspects of the network of FIG. 1 disposed on a vehicle.

The depicted processing unit 310 is disposed on-board the vehicle 110 in various embodiments (see, e.g., FIG. 3 and related discussion). It may be noted that, for ease and clarity of illustration, in the depicted example, processing unit 310 is shown as a single unit; however, in various embodiments the processing unit 310 may be distributed among or include more than one physical unit, and may be understood as representing one or more processors. The processing unit 310 represents hardware circuitry that includes and/or is connected with one or more processors (e.g., one or more microprocessors, integrated circuits, microcontrollers, field programmable gate arrays, etc.) that perform operations described herein. The processing unit 310 in various embodiments stores acquired information in a tangible and non-transitory computer-readable storage medium (e.g., memory 312). Additionally or alternatively, instructions for causing the processing unit 310 to perform one or more tasks discussed herein may be stored in a tangible and non-transitory computer-readable storage medium (e.g., memory 312 in FIG. 2).

When the vehicle 110 is in the active state and can receive instructions for the off-board system 200, the processing unit 310 receives enforcement targets from the off-board system 200 (e.g., via communication unit 320). As discussed herein, the enforcement targets are associated with corresponding portions of a route to be traversed by the vehicle 110, and have corresponding associated enforcement activities to be performed based on location (e.g., proximity) of the vehicle 110 relative to the corresponding portions of the route. For example, an enforcement activity may be performed when the vehicle 110 is within a threshold distance or arrival time of an associated portion of the route, or as another example, when the vehicle 110 enters the associated portion of the route. Further, enforcement activities may have increasing levels of intervention that are implemented based on, for example, proximity to the corresponding portion of the route. For example, within a first threshold an instruction message may be displayed to an operator to implement an enforcement target (e.g., speed limit). If the vehicle 110 subsequently enters within a second, shorter threshold of the portion, the enforcement target may be implemented autonomously.

The processing unit 310 is also configured to store at least some of the received enforcement targets onboard the vehicle as preserved targets having corresponding preserved enforcement activities. The preserved targets and associated preserved enforcement activities may be stored, for example, in the memory 312. The preserved targets and associated preserved enforcement activities in the illustrated example are saved responsive to a transition from the active state to the degraded state of the vehicle 110. It may be noted that enforcement targets may be stored for a predetermined amount of time in a buffer, and then transferred from the buffer to a more permanent storage location responsive to a switch from the active to degraded state. Accordingly, transferring buffered enforcement targets to a more permanent or non-time-dependent storage location may be understood as saving enforcement targets as preserved targets in various examples. In one example, all received enforcement targets are saved in a buffer. Then, responsive to a change to the degraded state, the enforcement targets which are still pending or have enforcement activities that have not been implemented and/or completed may be saved as preserved targets.

Further, the depicted processing unit 310 is configured to perform the preserved enforcement activities associated with the preserved targets. For example, as the vehicle 110 approaches specific portions of the route associated with the preserved targets, the appropriate preserved enforcement activities may be performed. As one example, the enforcement activity may include displaying an instruction or other message to an operator. As another example, performing the enforcement activity may include autonomously operating the vehicle. For instance, in an example, if a command to slow the vehicle 110 to comply with a speed limit has not been satisfactorily implemented by the operator, the processing unit 310 may provide a control signal to the vehicle 110 to autonomously (e.g., without operator involvement) slow the vehicle 110 to comply with the speed limit. Accordingly, in various embodiments, enforcement activities may still be performed even though the vehicle 110 is in the degraded state, in contrast to conventional approaches for which the enforcement activities are lost and not performed in the degraded state. Accordingly, various embodiments improve the functioning and operation of processors (e.g., processing unit 310) by changing the operation of the processors (e.g., by saving information responsive to a switch from the active state to the degraded state).

Alternatively or additionally to performing the enforcement activities, in various embodiments, the processing unit 310 is configured to provide a prompt to the off-board control system 200 (or other off-board source of instructions) responsive to the transition from the active state to the degraded state. For example, the prompt may alert the off-board control system 200 of the transition. Additionally or alternatively, the prompt may inform the off-board control system 200 of which enforcement targets and activities have been preserved. Updated prompts as the preserved activities are implemented may also be sent to the off-board control system 200. Accordingly, the off-board control system 200 may monitor performance of enforcement targets and/or determine which enforcement targets have not been preserved, and act appropriately. For example, if it is determined that upcoming enforcement targets within a predetermined threshold time or distance have not been received and preserved by the vehicle 110, the off-board control system 200 may take steps to instruct the vehicle 110 to slow or stop and/or to instruct other vehicles in the vicinity (and/or one or more scheduling or dispatch centers) that the vehicle 110 is not receiving enforcement targets.

It may be noted that, in some examples, the preserved targets include at least one enforcement target for which corresponding enforcement activities have not yet been implemented at the time of the transition to the degraded state. For example, the enforcement target (or targets) may relate to portions of the route that the vehicle 110 has not yet encountered. In this way, enforcement targets that have been received but not yet implemented, may be implemented despite a transition to a degraded state.

Alternatively or additionally, the preserved targets may include at least one enforcement target for which corresponding enforcement activities have not yet been completed at the time of the transition to the degraded state. For example, the vehicle 110 may enter a portion of the route having an enforcement target, and begin performance of an enforcement activity of an enforcement target for that portion, such as displaying a speed limit and/or autonomously controlling the vehicle 110 to comply with the speed limit. While still in the portion of the route and while the enforcement activity is being performed, the vehicle 110 may transition to the degraded state. With the enforcement activity saved, the processing unit 310 can continue performing the enforcement activity. In this way, for enforcement targets that have been received and for which enforcement activities have begun but not finished, the enforcement activities may be completed despite a transition to a degraded state.

The depicted target preservation system 300 also includes a display 330. The display 330, for example, may include a screen configured to display prompts or messages to an operator of the vehicle 110. The display 330, for example, may display instructions called for by enforcement targets, such as speed limits. In some embodiments, performing an enforcement activity may include providing a prompt to an operator or the vehicle 110, for example to instruct an operator to follow a speed limit for a given portion of the route. Alternatively or additionally, the processing unit 310 may be configured to provide a prompt to an operator of the vehicle 110 (e.g., via display 330) responsive to the transition from the active state to the degraded state. For example, the prompt may alert the operator of the transition. As another example, the prompt may list one or more enforcement targets and/or associated enforcement activities that have been preserved. The prompt may be configured to be interactive, with the operator acknowledging receipt of the prompt and/or acknowledging individual enforcement targets and associated enforcement activities. In some examples, the display is color coded. For instance, higher priority or more urgent prompts may be displayed in red while other prompts are displayed in yellow and/or other colors.

The depicted target preservation system 300 also includes a communication device 320. Generally, the communication device 320 includes one or more components (e.g., receiver, transceiver) configured to communicate or obtain information from off-board sources such as the off-board control system 200 or wayside device 150. It may be noted that the communication device 320 is shown as a single distinct block for ease of illustration. However, in various embodiments the communication device 320 may work with or form a part of aspects of the target preservation system 300 (or be formed from one or more aspects of target preservation system 300) and/or the vehicle 110. In various embodiments, the communication device 320 receives enforcement targets from the off-board control system 200 and provides them to the processing unit 310. Further, in some embodiments, the target preservation system 300 may communicate with one or more off-board systems (e.g., office systems) to inform appropriate off-board systems when the vehicle 110 transitions to a degraded state. Further, the communication device 320 may also be utilized to communicate with the vehicle 110 (e.g., in embodiments where the target preservation system 300 or aspects thereof are disposed off-board the vehicle 110). For example, the target preservation system 300 may send control signals as discussed herein to the vehicle 110 via the communication unit 320.

It may be noted that, in various embodiments, the target preservation system 300 (or aspects thereof) is configured to be disposed on the vehicle 110. FIG. 3 illustrates an example embodiment in which the target preservation system 300 is disposed on the vehicle 110.

As seen in FIG. 3, the vehicle 110 includes a controller 402 that represents one or more processors that control movement and other operations of the vehicle. This controller can be referred to as a vehicle controller. The vehicle controller can represent an engine control unit, an onboard navigation system, or the like, that can control a propulsion system (e.g., one or more engines, motors, etc.) and/or a braking system (e.g., one or more friction brakes, air brakes, regenerative brakes, etc.) to control movement of the vehicle.

The vehicle optionally includes a control system 404 that communicates with the target preservation system 300 for receiving control signals. In some examples the control system 404 can autonomously initiate enforcement activities via controller 402 based on instructions received from the target preservation system 300 (e.g., an instruction to perform an enforcement activity such as slowing or stopping the vehicle 110). The control signals can be received by the vehicle controller and/or vehicle control system via a communication device 406. This communication device (as well as other communication units discussed herein) can include an antenna and wireless transceiving circuitry that wirelessly communicates signals with other communication devices described herein. It may be noted that in some examples the communication device 406 may be integrated into or associated with the communication unit 320 of a target preservation system 300 disposed onboard the vehicle 110. A tangible and non-transitory computer-readable storage medium (e.g., a memory 410) of the vehicle may store acquired information and/or instructions for causing performance of one or more tasks by the controller 402. It may be noted that one or more aspects of the vehicle 110 and target preservation system 300 may be shared, such as communication devices for communicating with the off-board control system 200.

Figure 4:
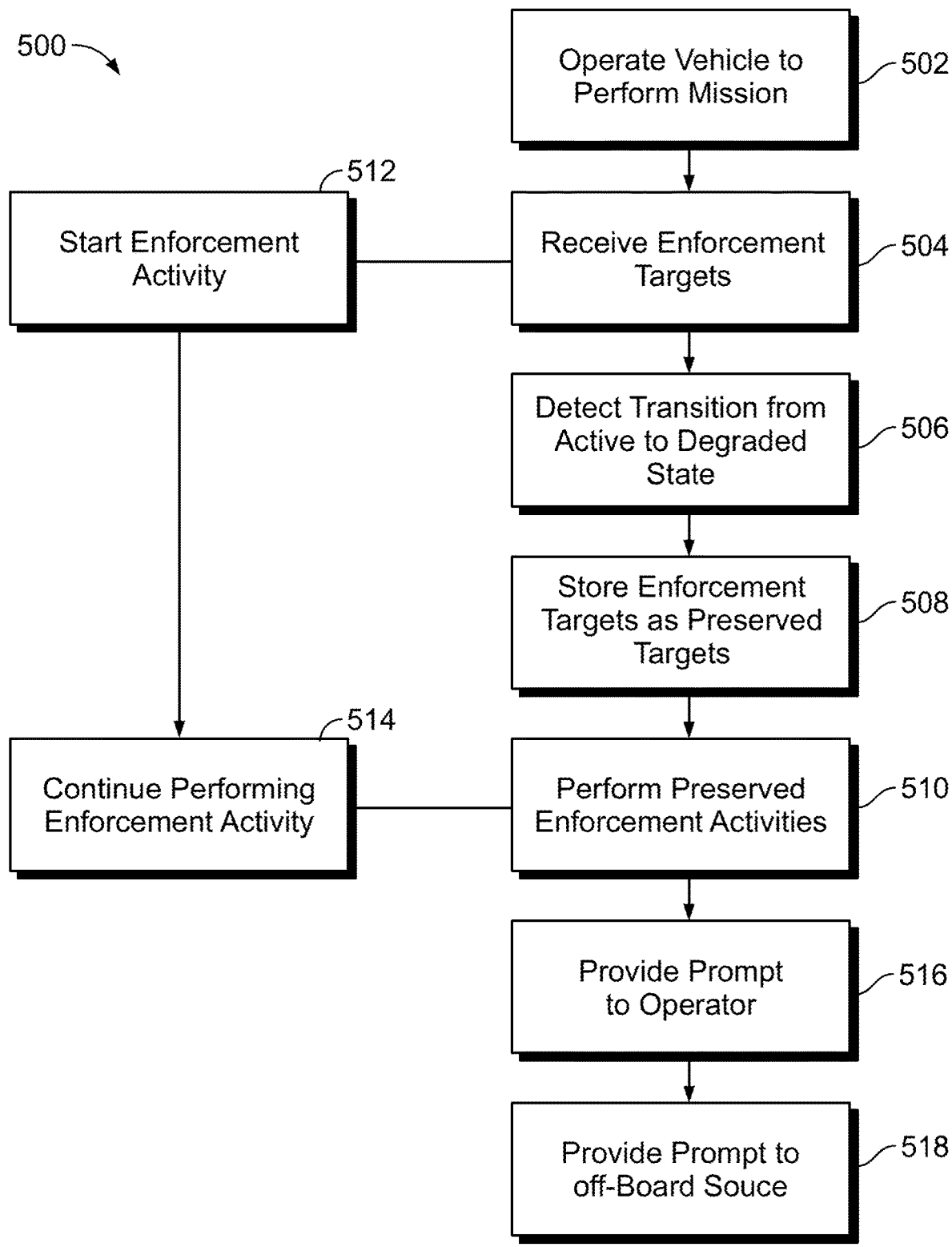
FIG. 4 illustrates a flowchart of one example of a method for controlling a vehicle traversing a route that receives instructions from an off-board source.

FIG. 4 illustrates a flowchart of one example of a method 500 for controlling a vehicle traversing a route having one or more phase breaks. The method 500, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 500 may be able to be used as one or more algorithms to direct hardware (e.g., one or more aspects of the processing unit 310) to perform one or more operations described herein.

At 502, a vehicle (e.g., vehicle 110) is operated to perform a mission along a route. In the illustrated example, the vehicle 110 is configured to receive enforcement targets from an off-board source.

At 504, with the vehicle in an active state in which the vehicle receives instructions from the off-board system, the vehicle and/or an associated system (e.g., a target preservation system 300 disposed on-board the vehicle 110) receives enforcement targets from an off-board source. The enforcement targets are associated with corresponding portions of a route to be traversed by the vehicle. For example, there may be one or more enforcement targets associated with a first portion of a route, one or more enforcement targets with a second portion of a route, and so on. The enforcement targets have corresponding associated enforcement activities to be performed based on location of the vehicle relative to the corresponding portion of the route as discussed herein. For example, an enforcement activity may include displaying a message to an operator as the vehicle approaches near or enters a portion of the route having a speed limit. As another example, an enforcement activity may include autonomously slowing a vehicle to meet a speed limit for a portion of the route as the vehicle approaches near or enters that portion.

At 506, a transition of the vehicle from an active state to a degraded state is detected (e.g., by target preservation system 300). For example, the system may detect a failure of a communication device or a GPS device, or, as another example, the target preservation system 300 may receive an input from a crew member indicating that the crew has transitioned the vehicle into the degraded state. In the degraded state, the enforcement targets are no longer received.

At 508, responsive to the transition from the active to the degraded state, at least some of the enforcement targets are stored onboard as preserved targets. The preserved targets have corresponding preserved enforcement activities.

At 510, the preserved enforcement activities associated with the preserved targets are performed. For example, as the vehicle progresses along the route, the enforcement activities may be performed as appropriate based on the portions of the route that the vehicle passes through. It may be noted that enforcement activities may include, as one example, providing a prompt on-board the vehicle to an operator of the vehicle, or as another example, performing the preserved enforcement activities includes autonomously operating a vehicle.

In some examples, the preserved targets include enforcement targets for which corresponding enforcement activities have not been started at the time of the transition to the degraded state. Additionally or alternatively, in some examples, the preserved targets include enforcement targets for which corresponding enforcement activities have been started but not yet completed at the time of the transition to the degraded state. For example, in the illustrated embodiment, at 512, an enforcement activity is started before the transition to the degraded state, and at 514, the enforcement activity that has been started but not completed before the transition is continued to be performed.

At 516, a prompt is provided to an operator of the vehicle responsive to the transition from the active state to the degraded state. At 518 of the illustrated example, a prompt is provided to the off-board source responsive to the transition from the active state to the degraded state. Accordingly, in various embodiments, an operator of the vehicle and/or an off-board system may be alerted to the transition of the vehicle to the degraded state and take appropriate steps.

In one embodiment, a system includes one or more processors configured to be disposed onboard a vehicle. The one or more processors are configured to receive, when in an active state of the vehicle in which the system receives instructions from an off-board system, enforcement targets from an off-board source. The enforcement targets are associated with corresponding portions of a route to be traversed by the vehicle, and have corresponding associated enforcement activities to be performed based on location of the vehicle relative to the corresponding portions of the route. The one or more processors are also configured to store at least some of the received enforcement targets onboard the vehicle as preserved targets having corresponding preserved enforcement activities, responsive to a transition from the active state to a degraded state of the vehicle in which the enforcement targets are no longer received. Also, the one or more processors are configured to perform the preserved enforcement activities associated with the preserved targets. For example, the one or more processors may be configured to control a vehicle system (e.g., control vehicle movement) based on the preserved enforcement activities.

Optionally, the preserved targets include at least one enforcement target for which corresponding enforcement activities have not yet been implemented at the time of the transition to the degraded state.

Optionally, the preserved targets comprise at least one enforcement target for which corresponding enforcement activities have not yet been completed at the time of the transition to the degraded state.

Optionally, performing the preserved enforcement activities comprises providing a prompt to an operator of the vehicle onboard the vehicle.

Optionally, performing the preserved enforcement activities comprises autonomously operating the vehicle.

Optionally, the one or more processors are configured to provide a prompt to an operator of the vehicle responsive to the transition from the active state to the degraded state.

Optionally, the one or more processors are configured to provide a prompt to the off-board source of the vehicle responsive to the transition from the active state to the degraded state.

In one embodiment, a system includes one or more processors configured to be disposed onboard a vehicle. The one or more processors are configured to receive, when in an active state of the vehicle in which the system receives instructions from an off-board system, enforcement targets from an off-board source. The enforcement targets are associated with corresponding portions of a route to be traversed by the vehicle, and have corresponding associated enforcement activities to be performed based on location of the vehicle relative to the corresponding portions of the route. The one or more processors are also configured to store at least some of the received enforcement targets onboard the vehicle as preserved targets having corresponding preserved enforcement activities, responsive to a transition from the active state to a degraded state of the vehicle in which the enforcement targets are no longer received. Further, the one or more processors are configured to provide a prompt to the off-board source responsive to the transition from the active state to the degraded state.

Optionally, the one or more processors are configured to perform the preserved enforcement activities associated with the preserved targets. In an example, the preserved targets comprise at least one enforcement target for which corresponding enforcement activities have not yet been implemented at the time of the transition to the degraded state. Additionally or alternatively, the preserved targets comprise at least one enforcement target for which corresponding enforcement activities have not yet been completed at the time of the transition to the degraded state. In an example, performing the preserved enforcement activities comprises providing a prompt to an operator of the vehicle onboard the vehicle. In another example, performing the preserved enforcement activities comprises autonomously controlling the propulsion system of the vehicle. In an example, the one or more processors are configured to provide a prompt to an operator of the vehicle responsive to the transition from the active state to the degraded state.

In one embodiment, a method includes receiving, when in an active state of the vehicle in which the system receives instructions from an off-board system, enforcement targets from an off-board source. The enforcement targets are associated with corresponding portions of a route to be traversed by the vehicle, and have corresponding associated enforcement activities to be performed based on location of the vehicle relative to the corresponding portions of the route. The method also includes storing at least some of the received enforcement targets onboard the vehicle as preserved targets having corresponding preserved enforcement activities, responsive to a transition from the active state to a degraded state of the vehicle in which the enforcement targets are no longer received. Further, the method includes performing the preserved enforcement activities associated with the preserved targets.

Optionally, the preserved targets comprise enforcement targets for which corresponding enforcement activities have not yet been implemented at the time of the transition to the degraded state.

Optionally, the preserved targets comprise enforcement targets for which corresponding enforcement activities have not yet been completed at the time of the transition to the degraded state, and the method includes continuing to perform an enforcement activity that has been started but not completed.

Optionally, performing the preserved enforcement activities comprises providing a prompt to an operator of the vehicle onboard the vehicle.

Optionally, performing the preserved enforcement activities comprises autonomously operating the vehicle.

Optionally, the method includes providing a prompt to an operator of the vehicle responsive to the transition from the active state to the degraded state.

Optionally, the method includes providing a prompt to the off-board source responsive to the transition from the active state to the degraded state.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more processors configured to be disposed onboard a vehicle and to:

receive, while in an active state of the vehicle in which the system receives instructions from an off-board source, enforcement targets from the off-board source, the enforcement targets associated with corresponding portions of a route to be traversed by the vehicle, the enforcement targets having corresponding associated enforcement activities to be performed based on a location of the vehicle relative to the corresponding portions of the route;

store the received enforcement targets onboard the vehicle for a predetermined amount of time in a buffer;

responsive to a transition from the active state to a degraded state of the vehicle in which the enforcement targets are no longer received, transfer the received enforcement targets from the buffer to a memory and save on the memory as preserved targets having corresponding preserved enforcement activities; and perform the preserved enforcement activities associated with the preserved targets, wherein the preserved enforcement activities include one or more of slowing movement of the vehicle to comply with a speed limit of the route, informing the off-board source of which of the received enforcement targets were stored as the preserved enforcement activities, or continuing performance of a current enforcement target of the received enforcement target that was being performed as the vehicle transitioned from the active state to the degraded state.

2. The system of claim 1, wherein the preserved targets comprise at least one enforcement target for which corresponding enforcement activities have not yet been implemented at the time of the transition to the degraded state.

3. The system of claim 1, wherein the preserved targets comprise at least one enforcement target for which corresponding enforcement activities have not yet been completed at the time of the transition to the degraded state.

4. The system of claim 1, wherein performing the preserved enforcement activities comprises providing a prompt to an operator of the vehicle onboard the vehicle.

5. The system of claim 1, wherein performing the preserved enforcement activities comprises autonomously operating the vehicle.

6. The system of claim 1, wherein the one or more processors are configured to provide a prompt to an operator of the vehicle responsive to the transition from the active state to the degraded state.

7. The system of claim 1, wherein the one or more processors are configured to provide a prompt to the off-board source of the vehicle responsive to the transition from the active state to the degraded state.

8. A system comprising:
one or more processors configured to be disposed onboard a vehicle and to:
receive, while in an active state of the vehicle in which the system receives instructions from an off-board source, enforcement targets from the off-board source, the enforcement targets associated with corresponding portions of a route to be traversed by the vehicle, the enforcement targets having corresponding associated enforcement activities to be performed based on location of the vehicle relative to the corresponding portions of the route;

store the received enforcement targets onboard the vehicle for a predetermined amount of time in a buffer; and responsive to a transition from the active state to a degraded state of the vehicle in which the enforcement targets are no longer received, transfer the received enforcement targets from the buffer to a memory and save on the memory as preserved targets having corresponding preserved enforcement activities, wherein the preserved enforcement activities include one or more of slowing movement of the vehicle to comply with a speed limit of the route, informing the off-board source of which of the received enforcement targets were stored as the preserved enforcement activities, or continuing performance of a current enforcement target of the received enforcement target that was being performed as the vehicle transitioned from the active state to the degraded state, wherein the one or more processors are configured to provide a prompt to the off-board source responsive to the transition from the active state to the degraded state.

9. The system of claim 8, wherein the one or more processors are configured to perform the preserved enforcement activities associated with the preserved targets.

10. The system of claim 9, wherein the preserved targets comprise at least one enforcement target for which corresponding enforcement activities have not yet been implemented at the time of the transition to the degraded state.

11. The system of claim 9, wherein the preserved targets comprise at least one enforcement target for which corresponding enforcement activities have not yet been completed at the time of the transition to the degraded state.

12. The system of claim 9, wherein performing the preserved enforcement activities comprises providing a prompt to an operator of the vehicle onboard the vehicle.

13. The system of claim 9, wherein performing the preserved enforcement activities comprises autonomously controlling a propulsion system of the vehicle.

14. The system of claim 9, wherein the one or more processors are configured to provide a prompt to an operator of the vehicle responsive to the transition from the active state to the degraded state.

15. A method comprising:
receiving, while in an active state of a vehicle in which the vehicle receives instructions from an off-board source, enforcement targets from the off-board source, the enforcement targets associated with corresponding portions of a route to be traversed by the vehicle, the enforcement targets having corresponding associated enforcement activities to be performed based on location of the vehicle relative to the corresponding portions of the route;

storing the received enforcement targets onboard the vehicle for a predetermined amount of time in a buffer;

responsive to a transition from the active state to a degraded state of the vehicle in which the enforcement targets are no longer received, transferring the received enforcement targets from the buffer to a memory and saving the received enforcement targets on the memory as preserved targets having corresponding preserved enforcement activities; and performing the preserved enforcement activities associated with the preserved targets, wherein the preserved enforcement activities include one or more of slowing movement of the vehicle to comply with a speed limit of the route, informing the off-board source of which of the received enforcement targets were stored as the preserved enforcement activities, or continuing performance of a current enforcement target of the received enforcement target that was being performed as the vehicle transitioned from the active state to the degraded state.

16. The method of claim 15, wherein the preserved targets comprise enforcement targets for which corresponding enforcement activities have not yet been implemented at the time of the transition to the degraded state.

17. The method of claim 15, wherein the preserved targets comprise enforcement targets for which corresponding enforcement activities have not yet been completed at the time of the transition to the degraded state, the method comprising continuing to perform an enforcement activity that has been started but not completed.

18. The method of claim 15, wherein performing the preserved enforcement activities comprises providing a prompt to an operator of the vehicle onboard the vehicle.

19. The method of claim 15, wherein performing the preserved enforcement activities comprises autonomously controlling a propulsion system the vehicle.

20. The method of claim 15, further comprising providing a prompt to an operator of the vehicle responsive to the transition from the active state to the degraded state.

21. The method of claim 15, further comprising providing a prompt to the off-board source responsive to the transition from the active state to the degraded state.

* * * * *